Jan. 27, 1948.　　　　S. ALSOP　　　　2,435,115
FILTER
Filed Nov. 19, 1943
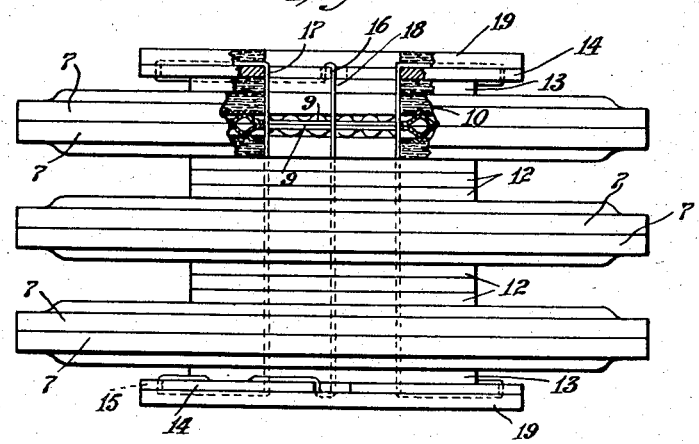
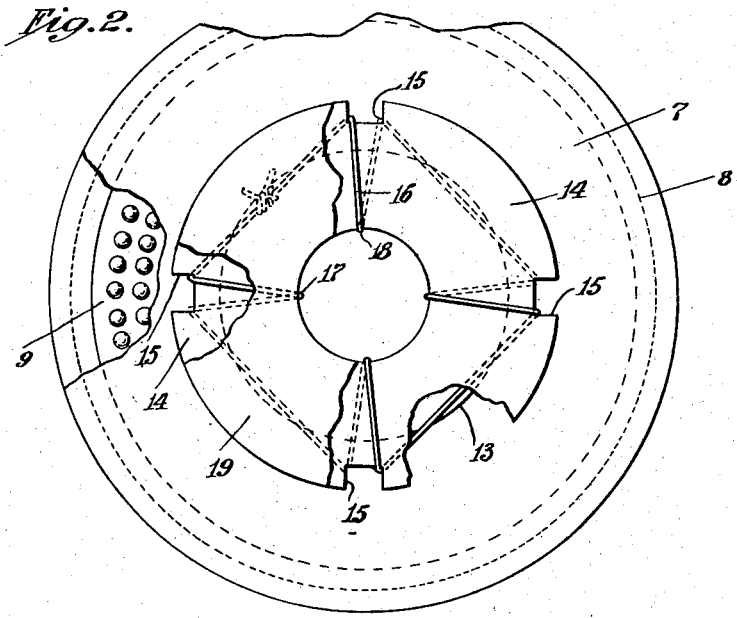
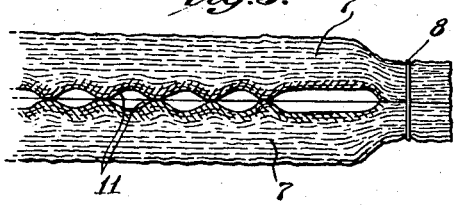
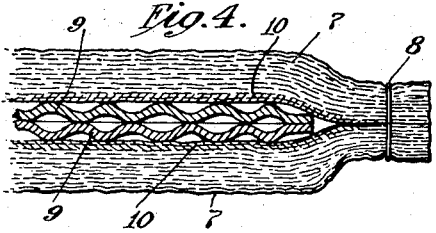
INVENTOR
Samuel Alsop
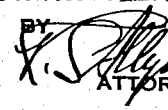
ATTORNEY Patented Jan. 27, 1948

2,435,115

UNITED STATES PATENT OFFICE 2,435,115

FILTER

Samuel Alsop, Meriden, Conn.

Application November 19, 1943, Serial No. 510,859

4 Claims. (Cl. 210—181)

My invention relates to means for filtering liquids and particularly to filters of the multiple disc or pad type of my Patent No. 2,392,354.

One object is to provide a simple and inexpensive method of connecting a number of duplex pads or discs together into a pack so that they can be handled, shipped, inserted into and removed from a housing or casing as a unit.

Another object is to provide an effective and durable filter unit.

Another object is to construct a satisfactory filter pack without the use of metal.

The filtering unit consists of centrally perforated plates or discs of fibrous substances such as wood pulp and asbestos connected together around their peripheries and spaced apart between the central openings and the peripheries. These discs are quite satisfactory for filtering some liquids but in other cases the discs are likely to disintegrate or lose their shapes. Occasionally small particles become detached from the outlet side. I accordingly treat these discs with dilute solutions of varnish or other similar compounds capable of holding the fibres together. This somewhat decreases the permeability of the material but stiffens the discs and prevents disintegration.

The units are stacked coaxially and connected together in a very simple manner by means of a cord or cords passed through the central openings and woven about the edges of washers on the upper and lower ends of the pack.

Fig. 1 is a side view of a filter pack embodying my invention.

Fig. 2 is a plan view of the same, parts being broken away.

Figs. 3 and 4 are fragmentary sections on larger scale of two modifications of filter units.

Each unit preferably includes two discs or pads 7, 7 centrally perforated and connected around their peripheries for instance by stitching 8. Between the center and rims the discs are spaced apart for instance by embossed discs 9. The filter pads are preferably formed of layers of fibrous material such as sulphate pulp and asbestos fibres of graduated density deposited layer upon layer and densest at the bottom. The spacer discs may be formed of stiff paper coated or impregnated with some varnish or coating material so as to maintain passages above and below through which liquid which filters through the pads can flow toward the center and out the usual perforated center tube of the filter (not shown). The inner surface 10 of each of a unit pad is coated or impregnated with a dilute solution of a substance such as waterproof or liquid proof varnish and baked to harden it. Although this may have a tendency to somewhat reduce the permeability of the pad it greatly stiffens it and completely prevents any fine particles becoming loosened. This coating may be applied by spraying or brushing. Both surfaces may be coated in a similar manner. This gives additional stiffness and makes it possible to wash off or clean the filter unit although it may further reduce the permeability of the filter.

It is also possible to eliminate the separate spacer discs in some cases by impressing a number of small spacing bosses 11 in the surfaces of the pads before or after they are coated with the varnish and before they are hardened. When coated and hardened the bosses serve to keep the main filter masses spaced apart. The individual fibrous pads are quite different from those made of what is called ordinary filter paper. The latter have very little strength and when coated or impregnated are quite flexible. The present pads are quite thick, say ⅛" to ¼" and when coated or impregnated are quite inflexible and rigid. The filter units here shown are circular in form but the shape is unimportant.

These filter units are usually assembled in packs in a casing (not shown). The number is dependent upon the required capacity of the filter. When a filter has been in use for some time it is necessary to replace or clean the filtering elements. I accordingly assemble a suitable number of the pancake-like units with one or more spacing washers 12 between adjacent units and with similar washers 13 at the upper and lower ends of the pack to space the pack from the upper and lower ends of the casing (not shown). The washers 12 and 13 being of the same pulp substance as the pads 7 afford additional filtering material, the liquid passing radially inward through the edges of the washers.

Upon the upper and lower washers are located relatively stiff washers 14 which have notches 15. These washers are preferably cemented in place and a cord 16 is passed around the edge of one washer 14, then through the centers of the units at 17 and around the edge of the other washer 14, back at 18 through the centers to the first washer, thus back and forth until sufficient lengths have been run and the ends of the cord are secured in place. The units are pressed together during the process of tying the cord so as to hold the units securely together. Additional pulp washers 19, 19 are fixed on the stiff washers 14, 14 to cover the ends of the cords and serve as additional resilient abutments.

The use of a solution of approximately 20% varnish and 80% thinner increases the rate of filtration somewhat at first but due to the changed pore construction of the disc, the disc clogs upon the surface. Although the liquid flows faster at first it gets clogged up more rapidly than an untreated disc.

A filter unit as herein described which has been coated on both sides or soaked in the stiffening material may be readily washed off and used over and over again. This treatment is particularly valuable in filtering coolants used in grinding work where there is a large amount of sediment from the grinding wheels which collects all over the discs. When the discs become clogged up, the pack can be lifted out of the casing, rinsed off and put back for further use. This structure is also of special use in fine oil filtration when the discs can be washed off and used again.

For some kinds of work the results are much improved by the addition of upwards of 30% of asbestos fibre. When this fibre is properly broken down it is extremely fine and tightens up the pads and prevents small particles from passing through. With a small proportion of asbestos the pad is comparatively loose or open and with a larger proportion it becomes quite tight or close.

Treatment of such pads with dilute or weak solution of varnish and then baking them has substantially the same improved effect as similar treatment of pads made wholly of wood pulp or the like.

It stiffens the pads and renders them much more durable and effective.

I claim:

1. A non-metallic filter pack composed of a series of units each composed of two perforated pads of fibrous material secured together at their peripheries and spaced apart inwardly to provide passages for liquid, washer-like members between adjacent units, a washer-like member on the outer surface of each end unit and a flexible member passing through the units and washer-like members and laced around the washer-like end member for holding the parts together.

2. A non-metallic filter pack composed of a series of units composed of two centrally perforated pads of fibrous material secured together at their peripheries and spaced apart inwardly to provide passages for liquid, fibrous washer-like members between adjacent units, a washer-like member on the outer surface of each end unit, each of said latter washer-like members having peripheral notches, all of said parts being stacked with their openings coaxially arranged, and a flexible member passing centrally through said units and woven around said notches for holding the parts together.

3. A non-metallic filter pack composed of a series of units each composed of two centrally perforated pads of fibrous material secured together at their peripheries and spaced apart inwardly to provide passages for liquid, washer-like members between adjacent units, a plurality of cord members passing through the center of said units and said washer-like members and means at the opposite ends of the pack for anchoring the ends of the cord members, said cord members being spaced apart around the sides of the central perforations of the pads and the washer-like members to prevent the units from shifting laterally with respect to each other.

4. As an article of manufacture, a filtering unit comprising a stack of perforated filtering pads held in axial alinement by a number of cord-like flexible members extending through the perforations and secured at the top and bottom of the stack.

SAMUEL ALSOP.

REFERENCES CITED

The following references are of record in the file of this patent:

UNITED STATES PATENTS

| Number | Name | Date |
|---|---|---|
| 2,304,618 | Williams | Dec. 8, 1942 |
| 2,079,475 | Williams et al. | May 4, 1937 |
| 956,832 | Seitz | May 3, 1910 |
| 2,103,572 | Wells | Dec. 28, 1937 |
| 1,411,975 | Matson | Apr. 4, 1922 |
| 2,349,469 | Sloan | May 23, 1944 |
| 2,269,725 | Malanowski | Jan. 13, 1942 |
| 2,278,603 | Williams | Apr. 7, 1942 |
| 1,921,309 | Crammond et al. | Aug. 8, 1933 |
| 2,007,753 | Ericson | July 9, 1935 |
| 2,144,781 | Seitz | Jan. 24, 1939 |
| 2,228,320 | Magruder et al. | Jan. 14, 1941 |
| 2,298,980 | Sloan et al. | Oct. 13, 1942 |
| 2,196,821 | Arnold | Apr. 9, 1940 |
| 1,956,045 | Richter | Apr. 24, 1934 |
| 2,386,684 | Hermanson | Oct. 9, 1945 |

FOREIGN PATENTS

| Number | Country | Date |
|---|---|---|
| 782,899 | France | Mar. 25, 1935 |
| 497,204 | Great Britain | Dec. 14, 1938 |